United States Patent [19]

Robertson

[11] Patent Number: 4,525,395
[45] Date of Patent: Jun. 25, 1985

[54] SHAPED ARTICLES FROM POLY (P-METHYLSTYRENE) BLENDS

[75] Inventor: Arthur B. Robertson, Hillsborough, N.J.

[73] Assignee: Mobil Oil Corporation, New York, N.Y.

[21] Appl. No.: 455,360

[22] Filed: Jan. 3, 1983

[51] Int. Cl.³ .............................................. B32B 27/32
[52] U.S. Cl. .................... 428/35; 204/159.17; 525/301.5
[58] Field of Search ............... 204/159.17; 525/301.5; 428/35

[56] References Cited

U.S. PATENT DOCUMENTS

| | | | |
|---|---|---|---|
| 3,137,674 | 6/1964 | Marans et al. | 260/45.5 |
| 3,293,201 | 12/1966 | Shahade et al. | 525/301.5 |
| 3,294,869 | 12/1966 | Robinson | 260/878 |
| 3,444,283 | 5/1969 | Carlson, Jr. | 264/53 |
| 3,619,445 | 11/1971 | Carlson, Jr. | 264/565 |
| 3,682,730 | 8/1972 | Haase | 156/79 |
| 4,086,287 | 4/1978 | Kaeding et al. | 585/467 |
| 4,205,114 | 5/1980 | Canterino et al. | 428/315 |
| 4,225,403 | 9/1980 | Arbit | 204/159.14 |
| 4,281,083 | 7/1981 | Arbit | 525/305 |
| 4,351,884 | 9/1982 | Robertson | 204/159.12 |
| 4,387,012 | 6/1983 | Arbit | 204/159.17 |

Primary Examiner—John E. Kittle
Attorney, Agent, or Firm—Alexander J. McKillop; Michael G. Gilman; Stanislaus Aksman

[57] ABSTRACT

Shaped articles of a blend of PPMS and sensitizer such as triallyl cyanurate or isocyanurate are provided. They are thermoformed and irradiated with sufficient ionizing radiation to effect sufficient cross-linking to render the shaped article resistant to fatty foods under microwave oven conditions. Claims are also directed to the method.

6 Claims, No Drawings

SHAPED ARTICLES FROM POLY (P-METHYLSTYRENE) BLENDS

CROSS REFERENCE TO RELATED APPLICATION

This application is related to U.S. application Ser. No. 183,600, filed Sept. 2, 1980 in the name of Arthur B. Robertson, now U.S. Pat. No. 4,351,884, issued Sept. 28, 1982, which relates to shaped articles of a blend of PPMS and triallyl cyanurate or isocyanurate. They are thermoformed and irradiated with sufficient ionizing radiation to effect sufficient cross-linking to render the shaped article resistant to fatty foods under microwave oven conditions. Claims are also directed to the method.

BACKGROUND OF THE INVENTION

1. Field of the Invention

This invention is directed to shaped article of poly(p-methylstyrene) blends and with such blends which can be cross-linked by ionizing radiation at low dosage levels.

2. Description of the Prior Art

In U.S. Pat. No. 4,205,114 there are disclosed shaped articles of poly(p-methylstyrene) that are cross-linked by ionizing radiation to render such articles resistant to fatty foods under microwave oven conditions. The amount of radiation required to cross-link poly(p-methylstyrene), however, is between about 50 megarads and about 60 megarads. This is too high to be commercially feasible. The desiteratum is to be able to effect the cross-linking at lower, more feasible dosage levels.

SUMMARY OF THE INVENTION

This invention provides a shaped article of a blend of poly(p-methylstyrene) and sensitizer thermoformed and irradiated with sufficient ionizing radiation to effect cross-linking sufficient to render the shaped article resistant to fatty foods under microwave oven conditions.

It also provides a method of making shaped articles that are resistant to fatty foods under microwave oven conditions, that comprises forming a blend of poly(p-methylstyrene) with an effective cross-linking amount of a sensitizer into a foamed or unfoamed sheet, thermoforming said sheet to produce a shaped article, and irradiating the shaped article with sufficient ionizing radiation to effect cross-linking sufficient to render the shaped article resistant to fatty foods under microwave oven conditions.

DESCRIPTION OF THE SPECIFIC EMBODIMENTS

The monomer used in preparing the homopolymer or copolymers from which the blends of this invention are made is p-methylstyrene. It is within the contemplation of this invention to use mixtures of methylstyrene rich in p-methylstyrene. Such mixtures contain at least about 90 weight percent, preferably at least about 95 weight percent, p-methylstyrene and less than 0.1 weight percent o-methylstyrene with the balance being m-methylstyrene. A typical mixture contains, by weight, about 95 percent p-methylstyrene, about 5 percent m-methylstyrene, and about 0.05 percent o-methylstyrene. The mixtures are obtained by catalytic dehydrogenation of the mixtures of ethylmethyl benzene isomers described in U.S. Pat. No. 4,086,287 to which reference is made.

The polymers contemplated herein are p-methylstyrene or p-methylstyrene-rich isomer mixture homopolymer or their copolymers containing between about 10 and about 1 weight percent conjugated diene, such as butadiene and isoprene. The polymerization reaction is carried out by using methods and catalysts well known in the art for polymerizing styrene. The reaction can be carried out in solution, bulk, suspension, or emulsion.

In accordance with this invention, the material that is blended with the poly(p-methylstyrene) is a sensitizer. The sensitizer which is blended with the impact poly(p-methylstyrene) may be one or more multifunctional vinyl monomers. Examples of such multifunctional vinyl monomers include triallyl cyanurate, triallyl isocyanurate, 1,6-hexanediol diacrylate, tetraethylene glycol diacrylate, trimethylolpropane triacrylate, pentaerythritol triacrylate, 1,6-hexanediol dimethacrylate, tetraethylene glycol dimethacrylate, trimethylolpropane trimethacrylate, pentaerythritol trimethacrylate, and polyunsaturated fatty acids such as linseed oil. Small amounts of sensitizer are effective to induce sufficient cross-linking by radiation at low dosage level. Generally, between about 0.1 weight percent and about 10 weight percent, preferably between about 0.5 weight percent and about 5 weight percent, will be used. Blending can be effected in a variety of ways, such as in solution in aromatic solvents, such as toluene, from which sheets or films can be cast. The blend components can be mixed in a tumbling agitator and fed into an extruder to produce sheets, films, or foamed sheets, or they can be fed separately to an extruder for extruder blending.

The blends can be formed into sheets, films, or foamed sheets and thermoformed to produce shaped articles, such as food containers. After being irradiated, such shaped articles are heat resistant and are not affected by fatty foods under microwave oven conditions.

Within the contemplation of this invention, "shaped articles of poly(p-methylstyrene) blend" refers to the blend of poly(p-methylstyrene) with sensitizer. This includes shaped articles made from foamed poly(p-methylstyrene) blend sheet, from biaxially oriented poly(p-methylstyrene) blend sheet, from biaxially oriented poly(p-methylstyrene) blend film laminated with biaxially oriented foamed poly(p-methylstyrene) blend sheet, or from biaxially oriented poly(p-methylstyrene) blend film laminated with foamed polystyrene sheet.

The manner by which foamed sheet is prepared is not an essential feature of this invention. The general methods of forming foamed sheet are discussed in U.S. Pat. No. 3,444,283 which is incorporated herein by reference. The preferred method is a direct injection extrusion operation described in U.S. Pat. No. 3,444,283. Reference is made herein to U.S. Pat. No. 3,619,445, incorporated herein by reference, which describes the complete direct injection extrusion foam lines. Ser. No. 506,836, referred to in U.S. Pat. No. 3,619,445, is now U.S. Pat. No. 3,444,283. As described in these incorporated patents, nucleating or cell size control agents can be used.

The invention is also applicable to injection molded articles made from poly(p-methylstyrene) blend resin.

The poly(p-methylstyrene) blend sheet contemplated herein can be produced by any known technique for making oriented polystyrene sheet or film. A feasible method is described in U.S. Pat. No. 3,682,730, particularly in columns 5 and 6, which patent is incorporated herein by reference.

The laminates of poly(p-methylstyrene) blend film with foamed polystyrene or poly(p-methylstyrene)

sheet are prepared as described in the aforementioned U.S. Pat. No. 3,682,730, incorporated herein by reference. Either foamed polystyrene sheet or foamed poly(p-methylstyrene) sheet can be used, so long as the film laminated thereto is poly(p-methylstyrene) blend.

The processes of thermoforming to produce shaped articles are well known to those skilled in the art. A generally preferred method of thermoforming is vacuum forming. The shaped articles produced by thermoforming poly(p-methylstyrene) blend sheet can vary widely. Typical shapes that are utilizable include trays, tubs, bowls, cups, and the like. Such shaped articles are adaptable for packaging foods and, when made from poly(p-methylstyrene) blend and irradiated in accordance with this invention, are adaptable for packaging foods containing fats.

Ionizing radiation is inclusive of extremely short-wavelength, high energetic, penetrating rays such as gamma rays, X-rays, and subatomic particles accelerated in cyclotrons, betatrons, synchrotrons, and linear accelerators. The effect of irradiating the shaped articles is to cross-link the poly(p-methylstyrene) blend. The irradiation dose can be between about 5 megarads and about 30 megarads; whereas poly(p-methylstyrene) requires between about 50 megarads and about 60 megarads. Similar blends using polystyrene are not cross-linked at low dosages.

EXAMPLES 1 THROUGH 6

A series of blends of poly(p-methylstyrene) (PPMS) with varying amounts of triallyl cyanurate or triallyl isocyanurate was prepared by melt blending in a Brabender mixer at 200° C. for 5 minutes. Each blend was dissolved in methylene chloride (25 weight percent solution) and cast with a Gardner film applicator onto a polyethylene terephthalate sheet. The solvent was evaporated at 60° C. in a vacuum oven to yield 3–4 mil films. The films were irradiated with an electron beam at dosages of 5, 10 and 30 megarads. The weight percent of cross-linking was determined by measuring solubility of irradiated films in toluene at room temperature. Insoluble gel found was filtered and dried to constant weight at 150° C. Pertinent data and results are set forth in the Table.

TABLE

| Example | Blend: PPMS + | 5 megarads | 10 megarads | 30 megarads |
|---|---|---|---|---|
| 1 | 1% Triallyl cyanurate | 11.1 | 13.4 | 68.1 |
| 2 | 2% Triallyl cyanurate | 5.3 | 53.4 | 71.8 |
| 3 | 1% Triallyl isocyanurate | 7.2 | 8.7 | 69.5 |
| 4 | 2% Triallyl isocyanurate | 2.5 | 65.3 | 80.0 |
| 5 | 5% Triallyl isocyanurate | 15.3 | 20.0 | 100.0 |
| 6 | 10% Triallyl isocyanurate | 16.8 | 63.0 | 99.9 |

Although the present invention has been described with preferred embodiments, it is to be understood that modifications and variations may be resorted to, without departing from the spirit and scope of the invention, as those skilled in the art will readily understand. Such modifications and variations are considered to be within the purview and scope of the appended claims.

What is claimed is:

1. A shaped article of a blend of poly(p-methylstyrene) and between about 0.1 percent and about 10 percent of a polyunsaturated fatty acid sensitizer thermoformed and irradiated with ionizing radiation between about 5 megarads and about 30 megarads to effect cross-linking to render the shaped article resistant to fatty foods under microwave oven conditions.

2. A shaped article of claim 1, wherein said blend contains between about 0.5 percent and about 5 percent sensitizer.

3. A shaped article of claim 2, wherein said sensitizer is linseed oil.

4. A method of making a shaped article that is resistant to fatty foods under microwave oven conditions, that comprises forming a blend of poly(p-methylstyrene) with between about 0.1 weight percent and about 10 weight percent of a polyunsaturated fatty acid sensitizer into a foamed or unfoamed sheet, thermoforming said sheet to produce the shaped article, and irradiating the shaped article with ionizing radiation between about 5 megarads and about 30 megarads to effect cross-linking to render the shaped article resistant to fatty foods under microwave oven conditions.

5. The method of claim 4, wherein said blend contains between about 0.5 percent and about 5 percent sensitizer.

6. The method of of claim 5, wherein said sensitizer is linseed oil.

* * * * *

UNITED STATES PATENT AND TRADEMARK OFFICE
CERTIFICATE OF CORRECTION

PATENT NO.  : 4,525,395

DATED       : JUNE 25, 1985

INVENTOR(S) : A. B. ROBERTSON

It is certified that error appears in the above-identified patent and that said Letters Patent is hereby corrected as shown below:

| | |
|---|---|
| Column 2, line 18: | After "acids" insert --or oils--. |
| Column 4, line 15: | "the invention" should be --this invention--. |
| Column 4, line 22: | After "acid" insert --or oils--. |
| Column 4, line 36: | After "acid" insert --or oils--. |
| Column 4, line 46: | Delete "of", first occurence. |

Signed and Sealed this

Eighth Day of October 1985

[SEAL]

Attest:

Attesting Officer

DONALD J. QUIGG

Commissioner of Patents and Trademarks—Designate